United States Patent [19]
Murayama

[11] Patent Number: 5,519,508
[45] Date of Patent: May 21, 1996

[54] COMMUNICATION APPARATUS AND METHOD FOR DELAYING TRANSMISSION TO ACCEPT INCOMING CALLS

[75] Inventor: Masahiro Murayama, Kawasaki, Japan

[73] Assignee: Canon Kabushiki Kaisha, Tokyo, Japan

[21] Appl. No.: 334,001

[22] Filed: Nov. 2, 1994

Related U.S. Application Data

[63] Continuation of Ser. No. 48,259, Apr. 16, 1993, abandoned.

[30] Foreign Application Priority Data

Apr. 28, 1992 [JP] Japan ................................. 4-136339

[51] Int. Cl.$^6$ ................................................ H04N 1/32
[52] U.S. Cl. ........................ 358/436; 358/439; 379/100
[58] Field of Search ..................... 358/400, 434–438; 379/100; H04N 1/00, 1/32

[56] References Cited

U.S. PATENT DOCUMENTS

| | | | |
|---|---|---|---|
| 5,038,226 | 8/1991 | Nagaishi | 358/434 |
| 5,050,005 | 9/1991 | Kagami | 358/434 |
| 5,081,539 | 1/1992 | Kaneko . | |
| 5,138,466 | 8/1992 | Saito | 358/435 |
| 5,142,525 | 8/1992 | Nakatsuma | 370/12 |
| 5,216,517 | 6/1993 | Kinoshita et al. | 358/403 |
| 5,216,520 | 6/1993 | Omura et al. | 358/442 |
| 5,287,402 | 2/1994 | Nakajima | 358/434 |
| 5,309,507 | 5/1994 | Hosaka et al. | 379/100 |
| 5,317,415 | 5/1994 | Kinami et al. | 358/434 |
| 5,321,741 | 6/1994 | Kaneko et al. | 358/434 |
| 5,369,688 | 11/1994 | Tsukamoto et al. | 358/437 |

*Primary Examiner*—Kim Yen Vu
*Attorney, Agent, or Firm*—Fitzpatrick, Cella, Harper & Scinto

[57] ABSTRACT

A communication apparatus detects an incoming-call during communication and rejects the incoming-call. If the apparatus detects the incoming-call during communication and rejects the incoming-call, delays calling for next transmission for a predetermined period after the current communication. If the apparatus detects the incoming-call within the predetermined period, it accepts the incoming-call. Thus, the apparatus can ensure an opportunity to accept an incoming-call without prolonging the entire communication time.

14 Claims, 5 Drawing Sheets

COMMUNICATION APPARATUS AND METHOD FOR DELAYING TRANSMISSION TO ACCEPT INCOMING CALLS

This application is a continuation of application Ser. No. 08/048,259 filed Apr. 16, 1993, now abandoned.

BACKGROUND OF THE INVENTION

The present invention relates to a communication apparatus and its communication method. The communication apparatus is able to detect an incoming-call signal during communication.

Conventional facsimile apparatuses having a memory for storing image data read from an original and transmitting stored image data in accordance with storing order or set transmission time are known.

Further, facsimile apparatuses which, if the destination apparatus is in communication status, stand by for a predetermined time to perform redialing, have been put into wide use.

Usually, a facsimile apparatus performs dialing to the destination apparatus as soon as possible after a transmission is instructed except in cases where a specific wait time is reserved. Accordingly, if the amount of transmission image data stored in the memory of the facsimile apparatus is large, or a multi-destination delivery (transmission of the same image data to a plurality of destinations) is designated to the facsimile apparatus, the facsimile apparatus sequentially transmits the stored transmission image data (hereinafter, transmission operation of this type is referred to as "sequential transmission").

In this case, the status of this apparatus is busy for a long period of time. If another facsimile apparatus, trying to transmit to the above apparatus in busy status, calls and repeats redialing, all the calls are rejected by the apparatus in busy status.

FIG. 6 shows a communication protocol in the conventional facsimile apparatus including the rejection of incoming-calls as described above. In FIG. 6, FAX-A sequentially performs calling for two transmissions to FAX-B, and FAX-C calls the FAX-A during the communication. It should be noted that in this case, an ISDN (Integrated Services Digital Network) line is used as a communication line.

The FAX-C performs redialing about two minutes after the initial rejection, however, the next call is rejected again. In this case, the FAX-C should perform redialing between (1-a) (termination of the first communication) and (1-b) (beginning of the next communication) so that the call from the FAX-C can be accepted. However, the interval between (1-a) and (1-b) is usually about ten seconds, therefore, the call from the FAX-C arrives during the next communication. As a result, the FAX-A subsequently being in busy status rejects the call from the FAX-C.

SUMMARY OF THE INVENTION

In view of the aforementioned problems and drawbacks of the conventional apparatus, an object of the present invention is to provide a communication apparatus and communication method which, even if sequential transmission is instructed, can receive an incoming-call before the termination of the transmission.

Another object of the present invention is to provide a communication apparatus and communication method which, if sequential transmission is instructed and an incoming-call detected during transmission is rejected, can reliably ensure an opportunity to accept the incoming-call transmitted by redialing by delaying a calling for the next transmission for a predetermined time period.

Another object of the present invention is to provide a communication apparatus and communication method which perform sequential transmission and ensure an opportunity to accept another incoming-call without extension of the whole communication time.

According to the present invention, the foregoing object is attained by providing a communication apparatus for communicating via a communication line which comprises: detection means for detecting an incoming-call during communication; and control means for, if the detection means detects the incoming-call, delaying calling for a next transmission after current communication is terminated, wherein if the detection means detects the incoming-call between the current communication and the next transmission, the communication apparatus accepts the incoming-call.

Further, a communication method of the communication apparatus according to the present invention is a communication method in a communication apparatus for communicating via a communication line which comprises the steps of: rejecting an incoming-call if the incoming-call is detected during communication; delaying calling for a next transmission for a predetermined period after current communication is terminated; and accepting the incoming-call, if the incoming-call transmitted by redialing is detected within the predetermined period.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
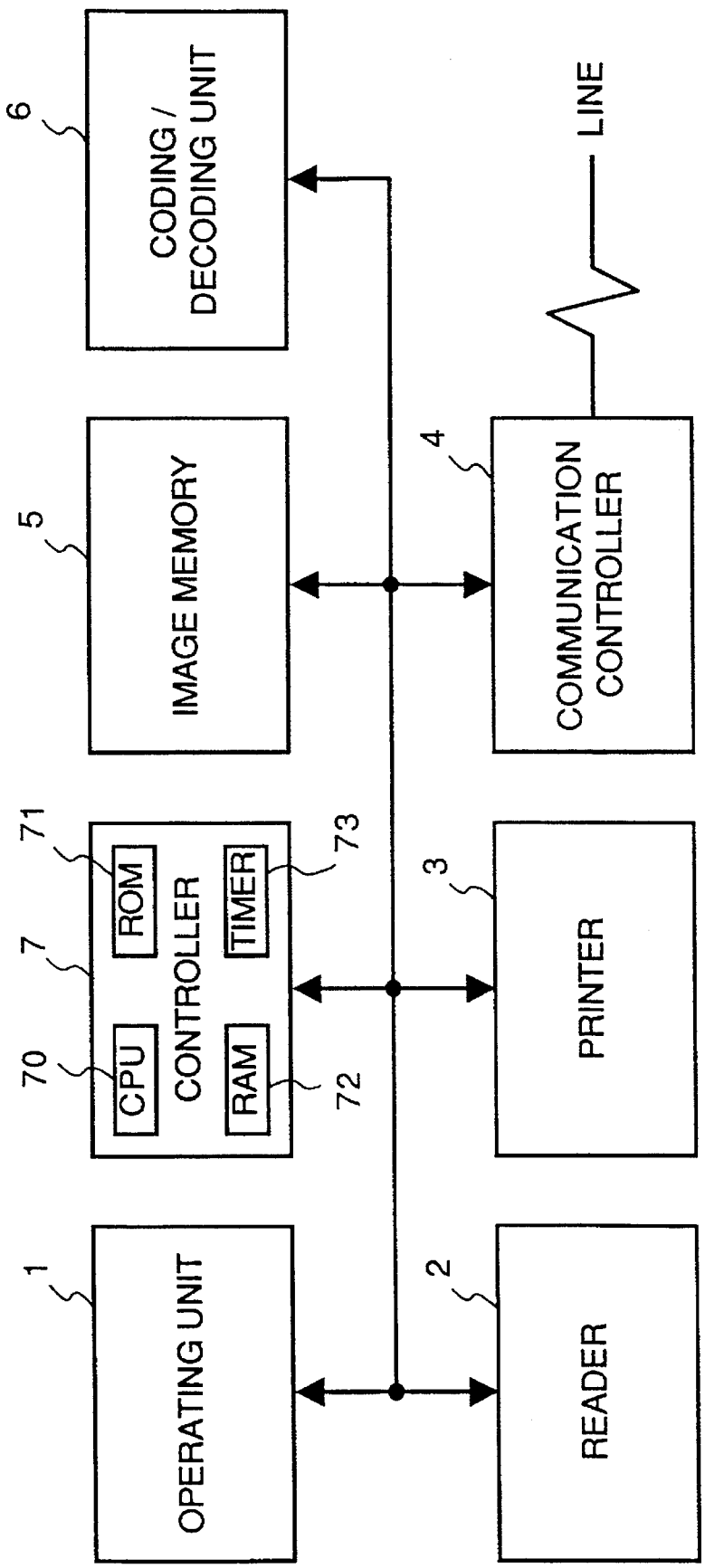
FIG. 1 is a block diagram showing the configuration of a facsimile apparatus according to an embodiment of the present invention.

FIG. 1 shows the configuration of a facsimile apparatus according to an embodiment of the present invention.

It should be noted that this apparatus performs communication via an ISDN line, and it can detect an incoming-call signal even when it is in communication status, further it can reject the detected incoming-call.

In FIG. 1, operating unit 1 comprises keys such as ten keys, various function keys and alphanumeric keys, and it has a display function such as a LCD (Liquid Crystal Display).

Reader 2 reads an original and converts the read data into black-and-white binary image data. The binary image data are stored into image memory 5. Printer 3 reads the image data out of the image memory 5 and prints an image on a recording sheet.

Communication controller 4 controls a communication via the ISDN line. Image data obtained by decoding facsimile image data received via the communication controller 4 are stored in the image memory 5 as well as the data binarized from the image data read by the reader 2.

Coding/decoding unit 6 performs coding of the image data read by the reader 2 or decoding of the received facsimile image data. Controller 7, comprising CPU 70, ROM 71 and RAM 72, controls the respective units for control of the overall apparatus. Timer 73 measures time set by the CPU 70 and outputs an interruption signal to the CPU 70 at every time it counts the set time.

Figure 2:
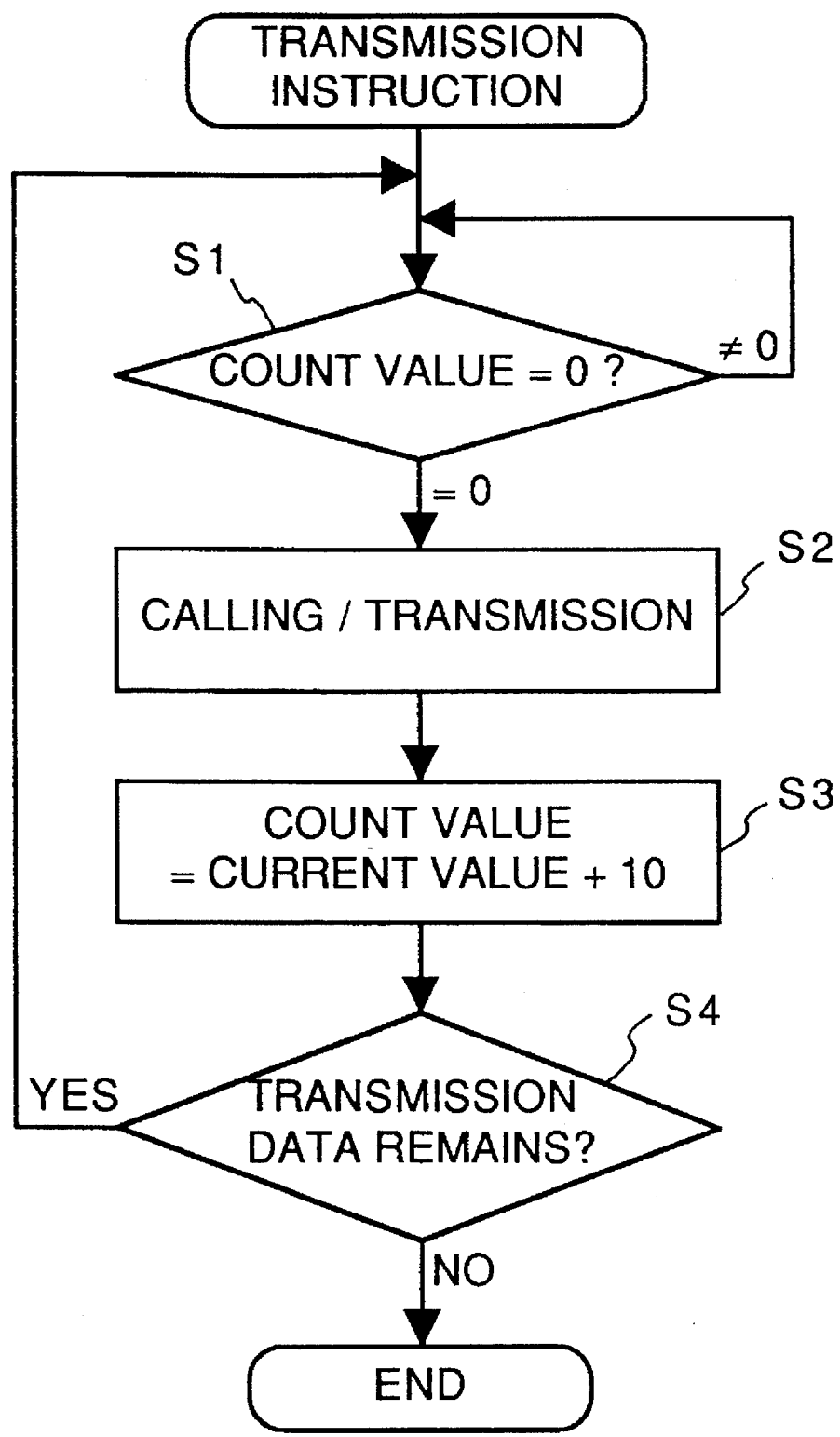
FIG. 2 is a flowchart showing a transmitting operation from the time of instructing a transmission to the time of a termination of the transmission in the facsimile apparatus.
Figure 3:
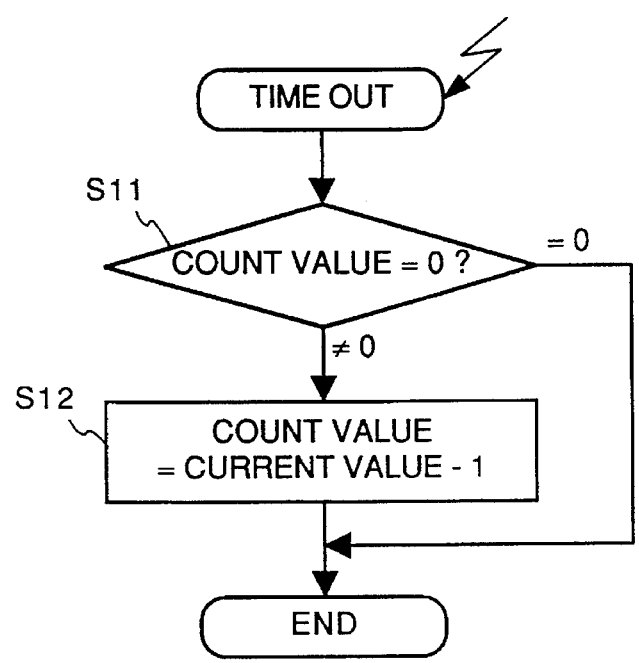
FIG. 3 is a flowchart showing a count-down process of a counter for measuring stand-by time in the facsimile apparatus.
Figure 4:
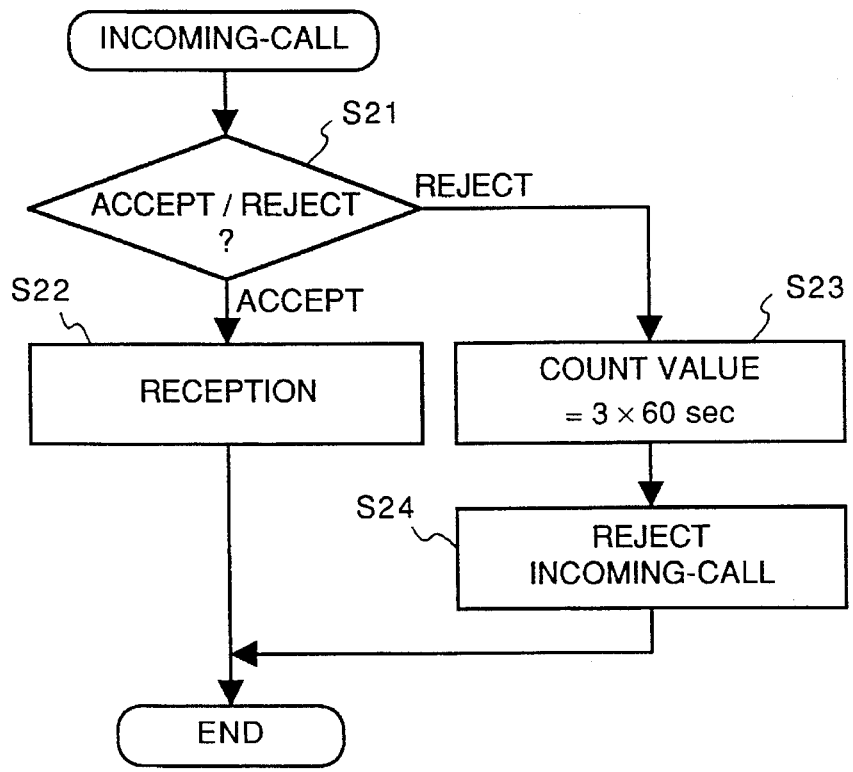
FIG. 4 is a flowchart showing a process in the facsimile apparatus when an incoming-call arrives in the present embodiment.

FIGS. 2 to 4 are flowcharts showing operations of the facsimile apparatus in the embodiment. Note that control programs for executing these operations are stored in the ROM 71 of the controller 7.

FIG. 2 shows operations in which an instruction of transmission is inputted from the operating unit 1 and then the entire communication is terminated.

First, a key of the operating unit 1 is pressed to instruct transmission. The reader 2 reads an original and the read image data is stored in the image memory 5. In step S1, whether or not the value of a counter is "0" is determined. This counter is provided in a predetermined address of the RAM 72 of the controller 7, and the CPU 70 counts down the count value at every second in accordance with an interruption signal from the timer 73. If a transmission is instructed during transmission or receiving operation, the step S1 is performed after the transmitting or receiving is terminated.

FIG. 3 shows the count-down operation by the interruption signal from the timer 73. The timer 73 generates an interruption signal at every second. The interruption signal starts an interruption routine of the program of the CPU 70, and in step S11, whether or not the count value is "≠0" is checked. If YES, the count value is decremented by one in step S12, thereafter, this interruption operation is terminated. In this manner, the count-down by one second is repeated till the count value becomes "0".

In FIG. 2, if the count value is not "0" in step S1, the loop of the step S1 is repeated till the value becomes "0", then the process proceeds to step S2 in which calling and image transmission are performed.

In step S3, after the termination of the transmission, a value "10"i.e., a value corresponding to ten seconds is added to the count value. This is not setting of a new count value, but adding of the value "10" to the current count value. Normally, the count value at this time is "0", therefore, the count value becomes "10" by the addition. However, if a rejection of an incoming-call had occurred, to be described later, the count value may be other than "0". In this case, the count value becomes more than "10".

In step S4, whether or not there is any destination(s) to which the apparatus has not transmitted image data is examined (cf. whether or not there is any untransmitted data is examined). If YES, the process returns to step S1 to wait till the count value becomes "0", thereafter, transmission is performed.

As described above, in case where a plurality of transmission processes are sequentially performed, if there is no rejection of incoming-call, the facsimile apparatus stands by for ten seconds after a current transmission is terminated, and after the ten-second interval, starts a calling for the next transmission.

Operations in case of incoming-call during communication will be described with reference to a flowchart of FIG. 4. It should be noted that the operations are performed in accordance with incoming-call monitoring operation which is independent of the transmission processes.

When an incoming-call arrives, the status of the apparatus is examined to determine whether or not the call can be accepted in step S21. If ACCEPT, reception process is performed in step S22. If the call cannot be accepted due to if being busy because of transmission, a value "180" corresponding to three minutes is set to the counter in step S23. Next, a release signal including a reason for call rejection is transmitted to the facsimile apparatus on the calling side in step S24.

It should be noted that in step S23, the count value is newly set regardless of current count value. Accordingly, if an incoming-call arrives during communication and the incoming-call is rejected, the next calling for transmission is suspended at least three minutes after the rejection of the incoming-call.

Figure 5:
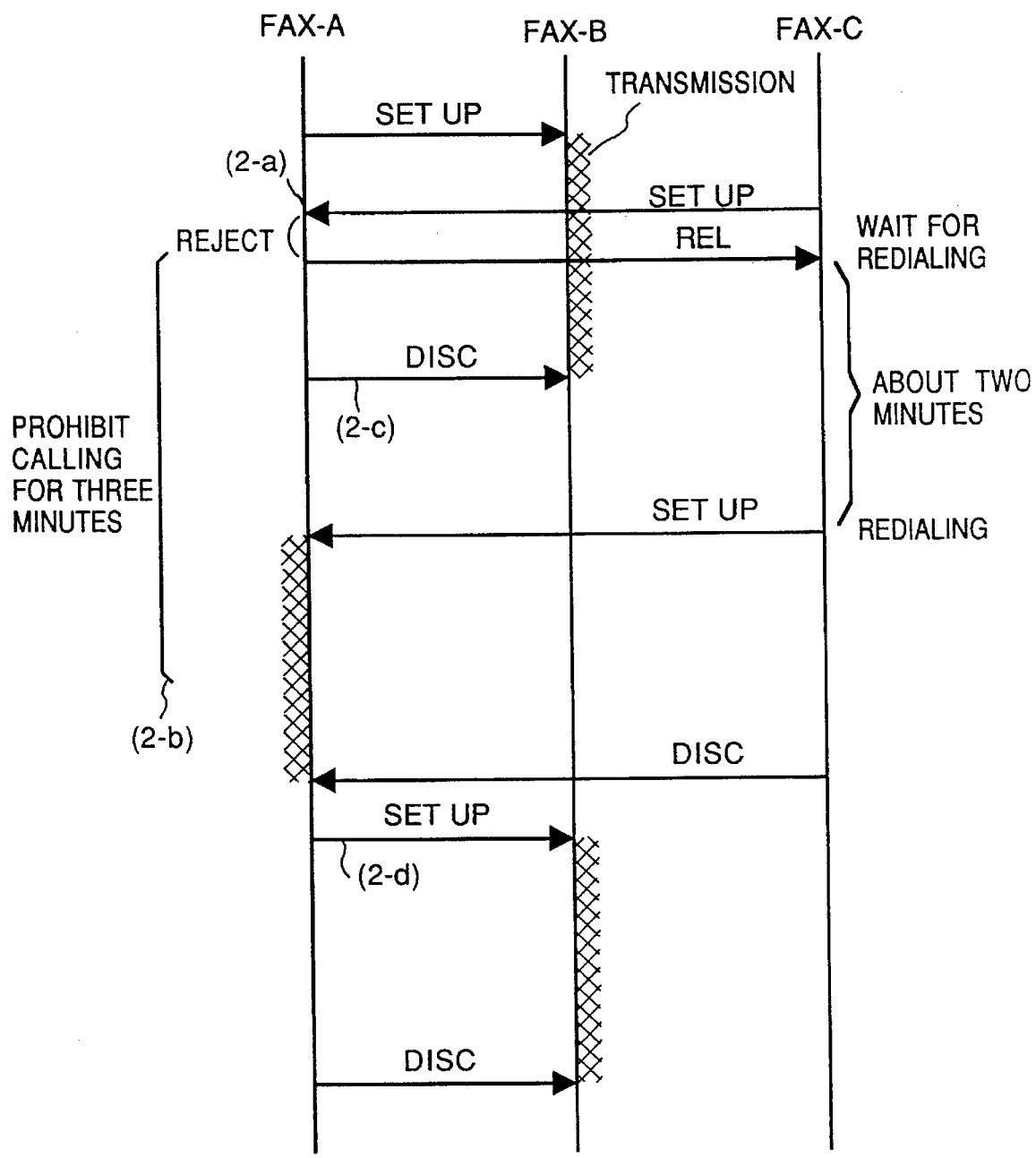
FIG. 5 is a diagram showing a communication protocol of the facsimile apparatus in the present embodiment.
Figure 6:
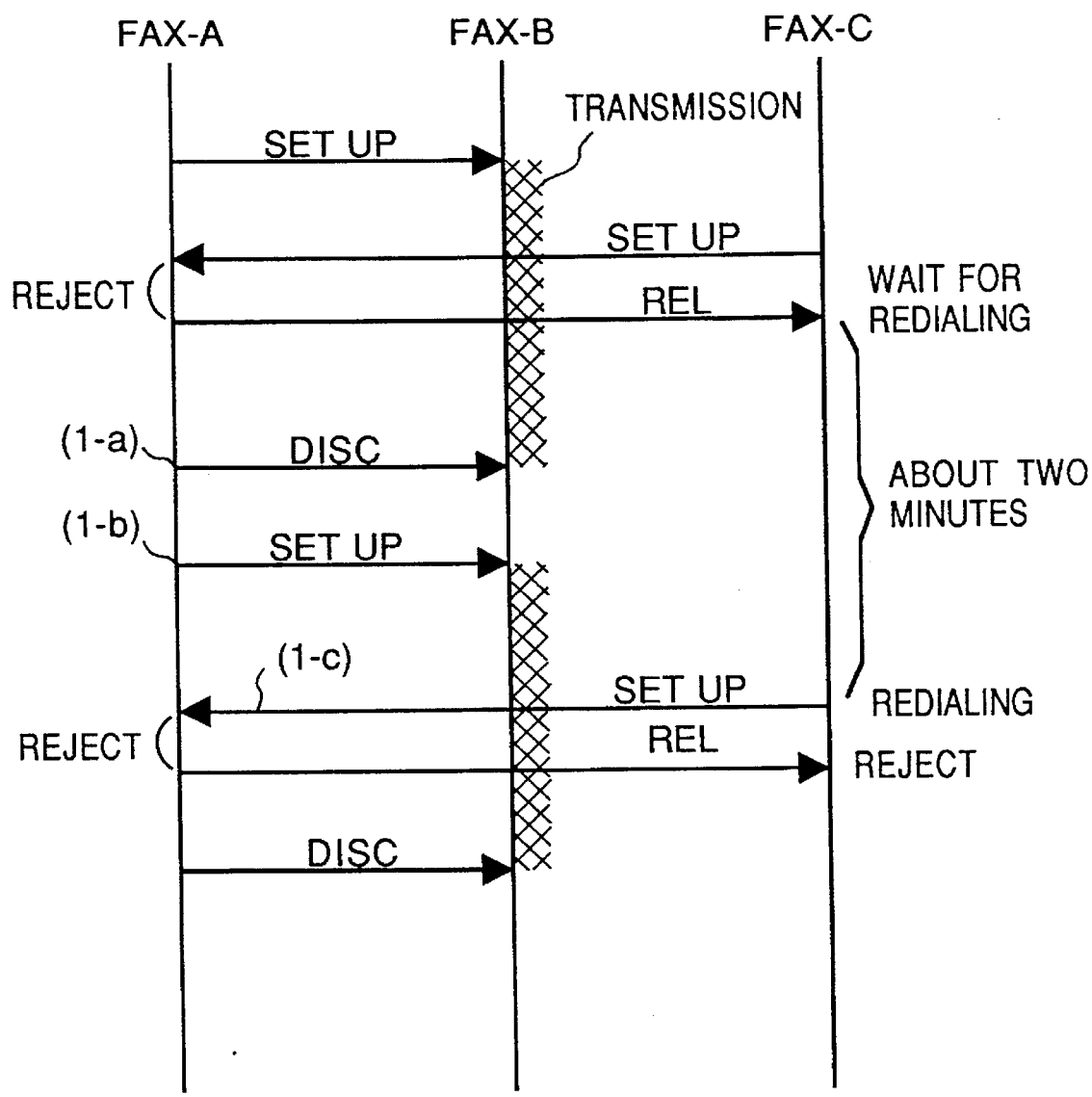
FIG. 6 is a diagram showing a communication protocol of a conventional apparatus.

FIG. 5 shows a communication protocol in the embodiment. Similarly to FIG. 6, FAX-A performs first and second transmissions to FAX-B, and during the communication, FAX-C calls the FAX-A.

The FAX-A detects an incoming-call signal from the FAX-C during the first communication and rejects the incoming-call. From that point in time (2-*a*), calling for the next communication is prohibited for three minutes (to point (2-*b*)).

On the other hand, the FAX-C changes to redial-waiting status. It can be determined that the waiting period is normally about two minutes.

As the FAX-A does not perform calling for the next transmission (2-*d*) for three minutes, it can accept the incoming-call transmitted by redialing from the FAX-C. In this manner, the FAX-A can be prevented from continuously rejecting incoming calls. In the FAX-A, if the first communication takes longer than two minutes, the incoming-call transmitted by redialing from the FAX-C after two minutes from the first rejection is again rejected. However, at this time, the count value is newly set as three minutes, and after the termination of the first communication (2-*c*), a three-minute calling prohibition is ensured. If the FAX-C repeats the redialing, the call can from the FAX-C be accepted by the FAX-A before the FAX-A starts calling for the next (second) transmission.

In the embodiment, the case where the FAX-A performs sequential transmission to the FAX-B has been described. It goes without saying that the present invention can be applied to a case where the FAX-A performs multi-destination delivery to the FAX-B and FAX-D (additional facsimile apparatus, not shown in FIG. 5). In this case, after the transmission from the FAX-A to the FAX-B, calling for the next transmission from the FAX-A to the FAX-D is prohibited for a predetermined period so that the FAX-A can accept an incoming-call from the FAX-C.

Further, in the embodiment, the case where the incoming-call from the FAX-C arrives while the FAX-A performs transmission to the FAX-B has been described, however, the present invention can be applied to a case where transmission from the FAX-A to the FAX-D is reserved while the FAX-A is receiving data from the FAX-B. In this case, while the FAX-A is receiving data from the FAX-B, the transmission data to the FAX-D is stored in the FAX-A, further, the FAX-C calls the FAX-A. The FAX-A's calling for the next transmission is prohibited for a predetermined period in response to the incoming-call from the FAX-C. During this period, the stored data is not transmitted to the FAX-D and the incoming-call from the FAX-C can be accepted.

It should be noted that the present invention can be realized by changing software of a conventional facsimile apparatus, for the timer and the counter (RAM) in the embodiment are essential elements for a facsimile apparatus. Thus, manufacturing costs can be lowered.

As described above, according to the present invention, even if a plurality of transmission operations are sequentially performed and an incoming-call during communication is rejected, an opportunity to accept the incoming-call can be ensured by prohibiting calling for the next transmission for a predetermined period.

Further, according to the present invention, an interval between the transmissions is lengthened only if an incoming-call during communication is rejected, and if no incoming-call arrives during the transmissions, the interval between the transmissions is short. Thus, an opportunity to accept the rejected incoming-call can be ensured without extremely extending the entire communication time.

The present invention can be applied to a system constituted by a plurality of devices, or to an apparatus comprising a simple device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus for successively performing a plurality of transmissions, comprising:

detection means for detecting an incoming call even while performing a current transmission;

control means responsive to the incoming call detected by said detection means, for determining whether or not the incoming call can be accepted; and rejection means for transmitting a rejection signal to a calling side of the incoming call received while performing the current transmission as a response to the incoming call detected by said detection means, so as to inform that the incoming call was rejected;

wherein said control means causes said rejection means to transmit the rejection signal to the calling side and delays an outgoing call for a new transmission for a predetermined time period after the current transmission is terminated, in order to accept a next incoming call from the calling side, in a case where the previous incoming call detected by said detection means was rejected.

2. The apparatus according to claim 1, wherein, if sequential transmissions are instructed and a remaining part of the sequential transmissions exists, said control means delays a calling for the remaining part of the sequential transmissions for a predetermined period when said detection means detects an incoming call while performing the sequential transmissions.

3. The apparatus according to claim 2, wherein the predetermined period is longer than a time interval between a time when said detection means detects the incoming call from the calling side while performing the current transmission and a time when said detection means detects the incoming call transmitted by a redialing of said calling side.

4. The apparatus according to claim 1, wherein the transmissions are facsimile transmissions.

5. A communication apparatus for successively performing a plurality of transmissions, comprising:

detection means for detecting an incoming call even while performing a current transmission;

rejection means responsive to the incoming call detected by said detection means, for determining whether or not a communication operation corresponding to the incoming call is able to be performed, and for transmitting a response to the incoming call to a calling side of the incoming call so as to reject the communication operation corresponding to the incoming call, in accordance with a determination;

delaying means for delaying a calling for a new transmission for a predetermined time period after the current transmission is terminated, if said rejection means rejected the communication operation corresponding to the incoming call because of the current transmission; and accepting means for, if the communication operation is able to be performed when the incoming call is detected, accepting the incoming call and performing the communication operation corresponding to the incoming call.

6. The apparatus according to claim 5, wherein the predetermined period is longer than a time interval between a time when said rejection means rejects the incoming call and a time when said detection means detects the incoming call transmitted by a redialing of said calling side.

7. A communication apparatus comprising:

communication means for performing communication;

detection means for detecting an incoming call even while a current transmission is being performed by said communication means;

request means for requiring transmission by said communication means;

control means responsive to the incoming call, for determining whether or not the incoming call can be accepted, and for causing said communication means to successively perform a plurality of transmissions at intervals of a first time period, in a case where the plurality of transmissions are required by said request means and where said detection means does not detect the incoming call while the transmission is being performed by said communication means; and rejection means for transmitting a rejection signal to a calling side of the incoming call received while performing the current transmission as a response to the incoming call so as to reject the incoming call, wherein said control means causes said rejection means to transmit the rejection signal to the calling side and delays an outgoing call for a next transmission required by said request means after a second time period longer than the first time period has elapsed after the current transmission is terminated, in order to accept a next incoming call from the calling side, in a case where the incoming call detected by said detection means was rejected.

8. The apparatus according to claim 7, wherein, said control means causes said communication means to perform communication in accordance with a detection of the incoming call within the first and second time periods.

9. The apparatus according to claim 7, wherein said communication means performs facsimile communication.

10. The apparatus according to claim 7, wherein said communication means performs communication via an ISDN.

11. A communication method for successively performing a plurality of transmissions at intervals of a predetermined period, comprising the steps of:

detecting receiving an incoming call even while a transmission is being performed;

determining whether or not the incoming call can be accepted, in response to the incoming call;

transmitting a rejection signal to a calling side of the incoming call received while performing a current transmission as a response to the incoming call, so as to inform that the incoming call cannot be accepted; and delaying an outgoing call for a new transmission for a predetermined time period after the current transmission is terminated, in order to accept a next incoming call from the calling side, in a case where the incoming call was rejected.

12. A communication method according to claim 11, further comprising a step of rejecting the incoming call which is detected by said detecting step.

13. A communication method according to claim 11, further comprising a step of accepting an incoming call which is detected while no communication is being performed.

14. A communication method according to claim 11, further comprising a step of setting a value to a counter, in order to determine a timing of the outgoing call for another communication, in accordance with the detection by the detecting step.

* * * * *

UNITED STATES PATENT AND TRADEMARK OFFICE
CERTIFICATE OF CORRECTION

PATENT NO.  : 5,519,508
DATED       : May 21, 1996
INVENTOR    : MASAHIRO MURAYAMA

It is certified that error appears in the above-identified patent and that said Letters Patent is hereby corrected as shown below:

COLUMN 3

Line 63,   "value "10", i.e," should read --value "10", i.e.,--;
   Line 64,   "not" should read --not a--.

COLUMN 4

Line 26,   "if" should read --it--.

COLUMN 7

Line 10,   "wherein," should read --wherein--.

Signed and Sealed this

Twenty-fourth Day of September, 1996

Attest:

BRUCE LEHMAN

*Attesting Officer*       *Commissioner of Patents and Trademarks*